United States Patent
Gaucas

(10) Patent No.: US 8,149,442 B2
(45) Date of Patent: Apr. 3, 2012

(54) KNOWLEDGE-BASED CONTENT SUB-SETTING METHOD FOR VARIABLE INFORMATION PRINTING

(75) Inventor: Dale E. Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 801 days.

(21) Appl. No.: 12/255,739

(22) Filed: Oct. 22, 2008

(65) Prior Publication Data

US 2010/0097633 A1    Apr. 22, 2010

(51) Int. Cl.
*G06F 3/12* (2006.01)
(52) U.S. Cl. ...... 358/1.15; 358/1.18; 358/442; 715/243; 709/229; 709/216
(58) Field of Classification Search .......... 358/1.15, 358/1.13, 402, 442, 403, 1.9, 1.18; 715/243, 715/235, 219; 709/229, 216, 225, 82
See application file for complete search history.

(56) References Cited

U.S. PATENT DOCUMENTS

| | | | |
|---|---|---|---|
| 6,032,004 A | 2/2000 | Mirabella, Jr. et al. | |
| 6,476,931 B1 * | 11/2002 | Aizikowitz et al. | 358/1.18 |
| 6,515,758 B2 * | 2/2003 | Uda et al. | 358/1.15 |
| 6,760,118 B1 * | 7/2004 | Kato | 358/1.15 |
| 6,826,727 B1 * | 11/2004 | Mohr et al. | 715/235 |
| 7,136,089 B2 * | 11/2006 | Able et al. | 347/262 |
| 7,151,547 B2 | 12/2006 | Lin et al. | |
| 7,633,638 B2 * | 12/2009 | Ducato | 358/1.15 |
| 7,765,469 B2 * | 7/2010 | Sembower et al. | 715/243 |
| 2004/0054757 A1 * | 3/2004 | Ueda et al. | 709/219 |
| 2005/0097448 A1 | 5/2005 | Giannetti et al. | |
| 2006/0156232 A1 | 7/2006 | Giannetti et al. | |
| 2008/0037059 A1 * | 2/2008 | Inoue | 358/1.15 |
| 2008/0084587 A1 * | 4/2008 | Noguchi | 358/451 |
| 2008/0231898 A1 * | 9/2008 | Iwanaga et al. | 358/1.15 |
| 2008/0288520 A1 * | 11/2008 | Robson | 707/101 |
| 2010/0110475 A1 * | 5/2010 | Johnson et al. | 358/1.15 |
| 2011/0123213 A1 * | 5/2011 | Yoda | 399/69 |

OTHER PUBLICATIONS

US 7,310,640, 12/2007, Purvis et al. (withdrawn)

* cited by examiner

*Primary Examiner* — Negussie Worku
(74) *Attorney, Agent, or Firm* — Gibb I.P. Law Firm, LLC

(57) ABSTRACT

A method receives a variable information print job and determines if any of the personalized content exceeds the size of a corresponding content area of the template. If the personalized content exceeds the size of a corresponding content area of the template, the method resolves such size inconsistencies (between the personalized content and the content area) by selectively removing and/or filtering portions of the personalized content according to the knowledge-based rules.

20 Claims, 3 Drawing Sheets

| All Tournaments | | |
|---|---|---|
| Tournament | Date | Site |
| RDGA Two Man Scramble | May 3 | Brockport CC- Brockport, NY |
| RDGA Two Man Best Ball | May 12 | Shadow Pines GC- Penfield, NY |
| RDGA Match Play Championship | May 16 - May 18 | Midvale CC- Penfield, NY |
| RDGA Two Man Aggregate | Jun 10 | Wayne Hills CC- Lyons, NY |
| Pee Wee Classic | Jun 30 - Jul 7 | Executive South- Henrietta, NY |
| Classic 1 East/West- Boys/Girls | Jul 1 | Perinton G&CC- Fairport, NY |
| RDGA District Championship | Jul 9 - Jul 12 | Penfield CC- Penfield, NY |
| RDGA Championship Green Qualifier | Jun 23 | Stafford CC- Stafford, NY |
| RDGA Championship Blue Qualifier | Jun 24 | Irondequoit- Rochester, NY |
| Classic 2 East/West- Boys/Girls | Jul 10 | Winged Pheasant- Shortsville, NY |
| Classic 3 East/West- Boys/Girls | Jul 14 | Chili Country Club- Scottsville, NY |
| RDGA Men's Mid Am Championship | Jul 21 - Jul 22 | Ravenwood GC- Victor, NY |
| Jr. Boys/Girls/Pee Wee Championship | Jul 28 - Jul 30 | Monroe GC- Pittsford, NY |
| Jr. / SubJr. Championship Qualifier's | Jul 22 - Jul 25 | Riverton GC- West Henrietta, NY Genesee Valley GC- Rochester, NY |
| New Mixed Handicap Outing | Aug 3 | Taranwould CC- Newark, NY |
| Junior/Adult Championship | Aug 14 | Livingston CC- Geneseo, NY |
| RDGA Sr./ Super Sr Championship | Aug 18 - Aug 20 | Blue Heron Hills CC- Macedon, NY |
| RDGA Men's Senior Age Flights | Sep 5 | Wild Wood CC- Rush, NY |
| RDGA Individual Net Stroke Play | Sep 9 | Sodus Bay Heights GC- Sodus Point, NY |

*FIG. 5*

KNOWLEDGE-BASED CONTENT SUB-SETTING METHOD FOR VARIABLE INFORMATION PRINTING

BACKGROUND AND SUMMARY

Embodiments herein generally relate to variable information printing and more particularly, concern a method that resolves inconsistencies between data and content area within a variable information template altering the data to fit within the template, according to previously established knowledge-based rules.

In variable information printing (VIP) applications, a document template may contain a content area of a defined size in which customized information is to be inserted. In the case of "one to one to one" VIP applications in which the target structure varies, there may be multiple templates for a campaign and, therefore, there may be target content areas of different size for the same source information. It may also be the case that the content source databases (or repositories) are augmented after the templates and content source mappings are defined. As a result of these situations, source content may overflow a target content area when a template instance is created for a given recipient.

Previous solutions to the content overflow problem include dynamic modification of a template (as shown in "Intelligent Content Fitting for Digital Publishing," Xiaofan Lin, HP Imaging Systems Laboratory, "Active Layout Engine: Algorithms and Applications in Variable, Data Printing," Xiaofan Lin, HP Digital Printing and Imaging Laboratory, and "Adaptive grid-based document layout," Jacobs C, Li W, et al., University of Washington). Other approaches reduce the content size by cropping images (as shown in U.S. Pat. No. 7,151,547, the complete disclosure of which is incorporated herein by reference), dynamically shrinking text in percentage increments (uDirect Standard Tutorial, XMPie, http://www.xmpie.com, available from XMPie Inc., New York, N.Y., USA, or modifying content properties, such as font (described in U.S. Patent Publication No. 2006/0156232, the complete disclosure of which is incorporated herein by reference).

Embodiments herein include a method that uses or establishes knowledge-based rules for processing variable information print jobs. The method receives a variable information print job, for a user, that comprises a reference to personalized content and a reference to at least one variable information template. Then, the method determines if any of the personalized content exceeds the size of a corresponding content area of the template.

If the personalized content exceeds the size of a corresponding content area of the template, the method resolves such size inconsistencies (between the personalized content and the content area) by selectively removing portions of the personalized content according to the knowledge-based rules. This dynamically reformulates the personalized content into a personalized content subset. Stated differently, the method resolves the size inconsistencies between the personalized content and the content area by altering the personalized content according to previously established user preferences. The method can then print (output) the variable information print job using the personalized content subset.

The user preferences can be established by the user or a third party who characterizes the user. For example, the variable information job could be prepared and printed by a vendor target marketing the user, where the vendor would establish the user preferences.

If the personalized content is componentized in a repository, the method performs a knowledge-based retrieval of less than all of the personalized content when resolving such inconsistencies. Similarly, if the personalized content is maintained in a database, the method performs knowledge-based filtering of the personalized content to retrieve less than all of the personalized content to resolve the inconsistencies. Thus, with embodiments herein, the resolving of the size inconsistencies is performed such that the personalized content subset maintains only the most relevant portions of the personalized content, as determined by relevancy standards within the predetermined knowledge-based rules.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 5 is a schematic diagram of personalized content within a variable information template.

DETAILED DESCRIPTION

The embodiments herein provide a knowledge-based subsystem for use in a variable information printing application for creating "one to one to one" (1:1:1) direct marketing campaign collateral. In such an application, user preferences dictate both the printed content and the targeted structure for that content. This subsystem performs rule-based "content sub-setting" in order to reduce content size. This enables the content to be inserted into a template content area (also referred to as a copy-hole) whose size cannot accommodate the full content due to overflow.

The content sub-setting techniques used by embodiments herein include (1) leveraging componentized source content in a document repository in order to retrieve content fragments, thereby enabling the knowledge-based retrieval of a portion of the content; and (2) knowledge-based filtering of content from a database in order to reduce its quantity. Both of these rule-based techniques make use of customer information, domain knowledge, and general heuristics.

The content sub-setting method herein is a subsystem of a "one to one to one" (1:1:1) variable information printing (VIP) system. The VIP system supports the creation of templates with defined content areas that are populated with personalized content for a given recipient. Content sources provide the personalized content for template content areas, directly from a lookup in a database or repository containing campaign data, or indirectly through the use of rules or procedures that determine the content values for a particular recipient.

Figure 1:
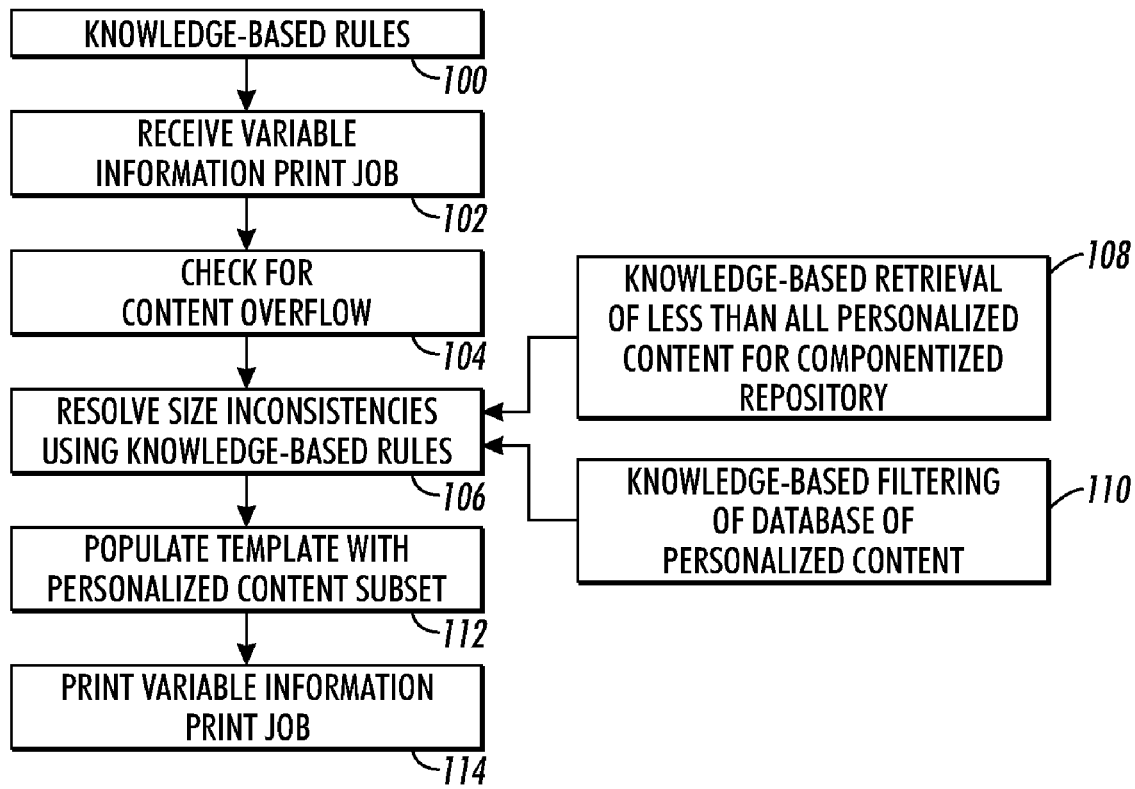
FIG. 1 is a flow diagram illustrating embodiments herein.

As shown in flowchart form in FIG. 1, embodiments herein provide a method that uses or establishes knowledge-based rules or user preferences for processing variable information print jobs (item 100). The knowledge-based rules or user preferences can be established by the user or a third party who characterizes the user. For example, the variable information job could be prepared and printed by a vendor target marketing the user, where the vendor would establish the knowledge-based rules or user preferences.

The method receives a variable information print job for the user in item 102. The variable information print job comprises a reference to personalized content and a reference to at least one variable information template. Then, in item 104, the method determines if any of the personalized content exceeds the size of the corresponding content area of the template (e.g., whether there is content overflow).

Generally, the main VIP system determines: what content is to be retrieved; where the content is to be inserted; the appropriate database or repository query/procedure to use in order to retrieve/compose the content; and the size of the target content area. Also the VIP system can detect content overflow by using the technique (U.S. Patent Publication No. 2006/0156232 the complete disclosure of which is incorporated herein by reference) which entails overflow detection after rasterizing/ripping.

In variable-data printing, it is quite likely that the different blocks of text that are to be selectively placed in the copy-hole will be of different lengths. For example, the same text may be provided in a number of different languages, so as to allow language specific documents to be produced. Alternatively, a completely different block of text may be provided dependent upon the subject matter of the document. Thus, there is a need to ensure that the object to be placed in the copy-hole will fit the pre-determined copy-hole.

In the case of variable text, the XSL-FO (Extensible Style Sheet Language Format Objects) associated with the object is used to specify some properties and/or constraints to control how the re-sizing of the text will be applied. For example, if the desired style for the copy-hole is to use the font Times New Roman with a size of 18 pt, the XSL-FO may specify the constraint that the font size may be reduced to a minimum of 12 pt using a 4 pt step size. An example of the use of XSL-FO to implement such constraints is provided in U.S. Patent Application 2005/0097448, the complete disclosure of which is incorporated herein by reference.

If the personalized content exceeds the size of a corresponding content area of the template, the method resolves such size inconsistencies (between the personalized content and the content area) by selectively removing portions of the personalized content according to the knowledge-based rules, as shown in item 106. This dynamically reformulates the personalized content into a personalized content subset. Stated differently, in item 106, the method resolves the size inconsistencies between the personalized content and the content area by altering the personalized content according to previously established knowledge-based rules and user preferences. The method can then print (output) the variable information print job using the personalized content subset.

Thus, after identifying such content overflow, the embodiments herein provide rule-based techniques in item 106 in order to produce a reduced size personalized content "subset" of the original personalized content from the repository. One such rule-based technique is knowledge-based retrieval of a portion of the content, when the content has been componentized and stored in a repository. Another such rule-based technique is knowledge-based filtering of the retrieved content, when the content has been stored in a database.

Thus, as shown in item 108, if the personalized content is componentized in a repository, the method performs a knowledge-based retrieval of less than all of the personalized content when resolving such inconsistencies. Similarly, as shown in item 110, if the personalized content is maintained in a database, the method performs knowledge-based filtering of the personalized content to retrieve less than all of the personalized content to resolve the inconsistencies. In both cases, the original database or repository query/procedure is dynamically reformulated to perform the restricted content retrieval as in the examples below.

Further, the embodiments herein can perform iterative processing. For example, the personalized content subset can be checked for overflow in the template content area. If the personalized content subset also overflows the template, it can be further reduced in size, in an iterative process (further content sub-setting) until the personalized content subset fits within the template content area.

Thus, with embodiments herein, the resolving of the size inconsistencies is performed such that the personalized content subset maintains only the most relevant portions of the personalized content, as determined by relevancy standards within the predetermined knowledge-based rules. Then, as shown in item 112, the template is populated with the personalized content subset. In item 114, the variable information print job is output to the user as a tangible, physically altered output.

Figure 2:
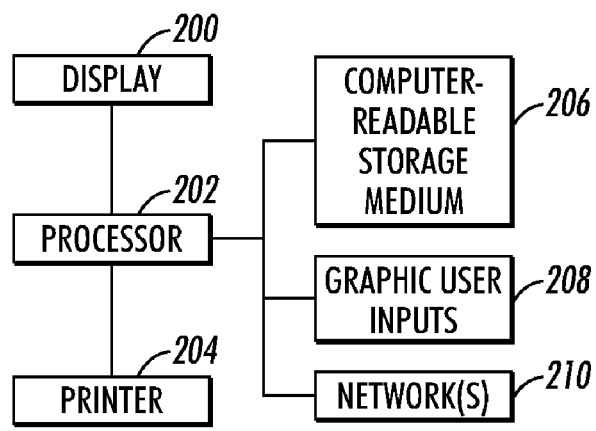
FIG. 2 is a schematic diagram of a system embodiment herein.

FIG. 2 illustrates one example of a system according to embodiments herein. As shown, the methodology herein can be stored as instructions on a computer-readable storage medium 206, such as a magnetic-based storage device (tape, disk, etc.), electronic memory, virtual storage, etc. Such instructions can be read and executed by a computerized device such as a processor 202 to perform the methods discussed herein. Further, the user, vendor, third party, etc., can interact with the system through a graphic user interface that can include graphic user inputs 208, such as a mouse, joystick, trackball, touchpad, keyboard, microphone, touchscreen, etc. and a display 200, such as a cathode ray tube, liquid crystal display, plasma display, projector, etc. A printer is illustrated as item 204 and connections to different networks, such an intranets, internets, wide area networks, local area networks, etc., are shown as item 210.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock, Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners, printers, and other similar peripheral equipment are available from Xerox Corporation, Norwalk, Conn., USA and the details of such devices are not discussed herein for purposes of brevity and reader focus.

Figure 3:
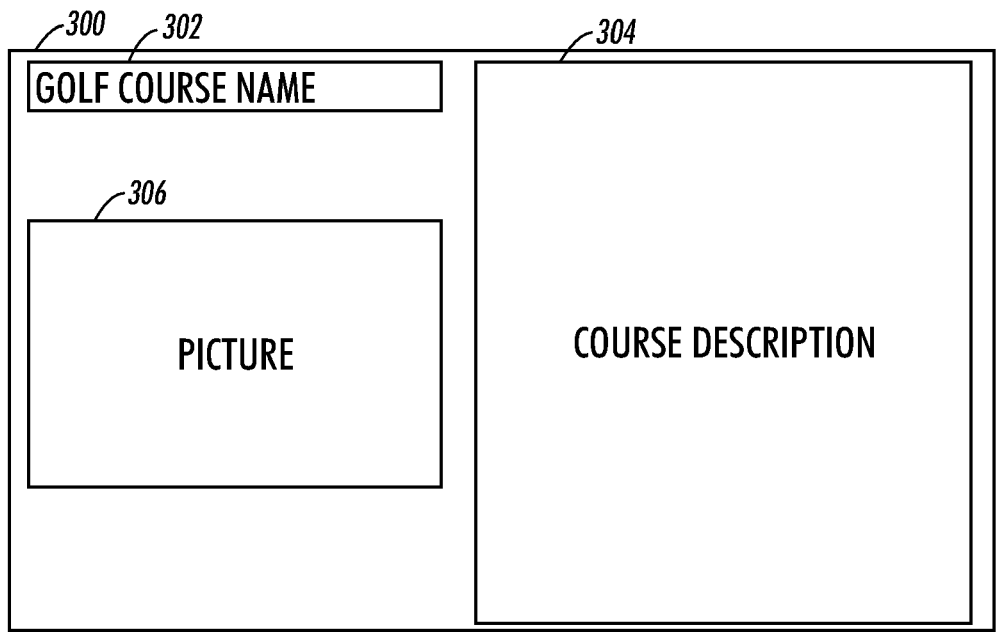
FIG. 3 is a schematic diagram of a variable information template.
Figure 4:
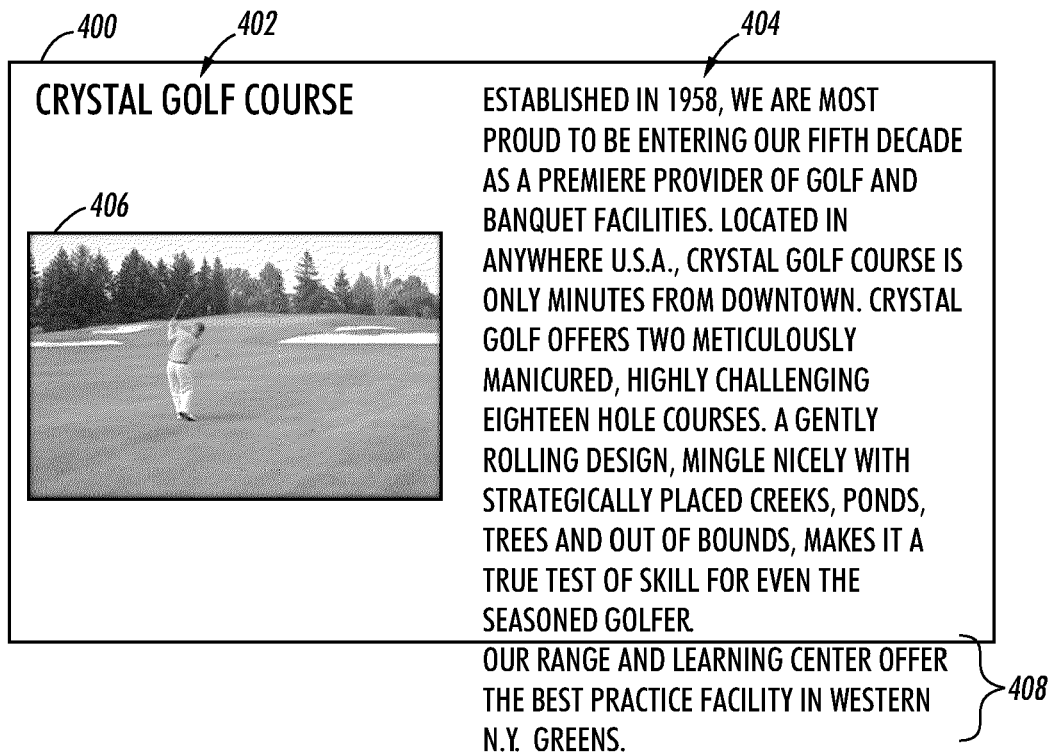
FIG. 4 is a schematic diagram of personalized content within a variable information template.

In one example, the embodiments herein can be applied to a personalized packaging of a variable information printed golf product. For example, FIG. 3 illustrates a template 300 that includes a golf course name content area 302, a golf course description content area 304, and a golf course picture content area 306. FIG. 4 illustrates the golf course name 402 "Crystal Golf Course" in the golf course name content area 302, a golf course description 404 in the golf course description content area 304, and a golf course picture 406 in the golf course picture content area 306.

Thus, the personalized content of the packaging surface could make the printed information 402-406 be about a golf course near a customer's home, and could list a golf course description and/or future golf tournaments in his area. The content sources for such a product 400 could comprise an extensible markup language (XML) based document repository storing many different golf course descriptions, and a database containing golf event calendars.

The packaging template 300 being used has fixed-size content areas 302-306 for the printed information. The original content source mappings for the template content areas 302-306 were developed for stored content that has subsequently been augmented, increasing the size of the retrieved content and causing overflow in the template, represented by item 408.

Embodiments herein use rules to determine how to retrieve a subset of the desired content as components from a document repository. For example, consider a source content element describing a Golf Course that is stored in an XML-based document repository with the following sub-elements: Overview Description, 18th Hole Image, Driving Range Description, Clubhouse Image, Clubhouse Description, Banquet Facilities Description, Golf Lessons Description, Directions, and Map Image. Assume that the original content source mapping for a template content area was a query that retrieved all of the Golf Course description sub-elements for a particular golf course closest to the recipient's home.

If the source content were too large for a target content area, its size could be reduced by applying rules that eliminate, for example, the Clubhouse image and the paragraphs on the Driving Range.

Some example rules to return a subset of the full Golf Course description are as follows:
  IF the source content element describes a Golf Course;
  AND the content element has an Overview sub-element;
  THEN return the Overview sub-element only.
  IF the source content element describes a Golf Course;
  AND the content element has an Image sub-element;
  THEN return all sub-elements except the Image sub-element.

An example domain-dependent rule that also uses customer information to return a content subset is as follows:
  IF the source content element describes a Golf Course;
  AND the content element has a Golf Lessons sub-element;
  AND the customer profile indicates Expert Golfer;
  THEN return all sub-elements except the Golf Lessons sub-element.

Some solutions to the overflow of the personalized content outside the boundaries of the content area of the template involve changing the size of the font, truncating the excessive personalized content, or altering the size of the content area within the template. The embodiments herein are different than these concepts and apply knowledge-based rules to reduce content and to make sure that the most relevant personalized content is retained.

For example, methods that arbitrarily truncate the portion of personalized content that overflows the content area may inadvertently remove some of the most relevant information. To the contrary, knowledge-based rules can pick and choose among the information to ensure that only the most relevant is retained. In a simplistic example, the knowledge-based rules can create a priority list of data types that specifies the order in which personalized content can be omitted, when it is necessary to do so. Different rule sets would establish other priorities for other classes of users and the following is only a very simplified example that illustrates the operation of embodiments herein.

For example, it can be decided that the content elements are provided the following priority values, with the lowest numbers being the most important (note that this is a different order than the items appear in the unaltered personalized content or in the template): Overview Description=1; Directions=2; 18th Hole Image=3; Banquet Facilities Description=4; Clubhouse Image=5; Clubhouse Description=6; Golf Lessons Description=7; Driving Range Description=8; and Map Image=9.

This allows the knowledge-base rules to almost always supply the Overview Description, Directions, and 18th Hole Image (which are deemed very important or very relevant) and also allows the knowledge-base rules to first omit the Map Image and Driving Range Description (which are deemed in this example to be less important or less relevant). To the contrary, a method that simply truncates the last portion of the personalized content (typically the Directions) might omit content is that deemed to be very important or relevant.

Embodiments herein also use rules to determine how to retrieve a subset of the desired content by reformulating a database query to limit the retrieved content. For example, consider a database that has records for 2008 PGA tournaments with the fields: Event Name, Date, Location and Golf Course Name. For a given direct marketing recipient at a known address, a VIP system might use a database query to retrieve an event calendar for all 2008 PGA tournaments within 100 miles of the customer's home. Assume that after the template design, new tournaments were added to the schedule.

An example rule to return a content subset of the tournament calendar is as follows. Note that this rule uses customer information as well as temporal and geographic heuristics to modify a database query in order to reduce the result set:
  IF the source content table is an Event Calendar;
  AND current date is d1 and customer zip code is z1;
  THEN modify and submit the database query for events by restricting location range to 10 miles within z1 and restricting event date to within 2 months after d1.

An example of a general heuristic is the following rule to restrict a database query to return a Title/Name field only for a given record, e.g., the Event Name only:
  IF the source content table is an Event Calendar;
  THEN modify and submit the database query to return the Event Name only for events within 100 miles of z1.

The following domain-dependent rule to return a content subset for event-related information omits less relevant information:
  IF the source content table is an Event Calendar with a Rain Date field;
  THEN modify and submit the database query for tournaments without returning the Rain Date field.

FIG. 5 illustrates an example of a golf tournament schedule for the months of May through September. This schedule may have been stored in a database with fields for Tournament name, Date, and Site. If this information were to be printed in a target content area that could not accommodate the full schedule, then a subset of the information might include only those tournaments within 10 miles of the customer's town and only those that are being held at most 6 weeks from the current date.

General aspects of variable information printing, are explained in U.S. Pat. No. 7,310,640 (the complete disclosure of which is incorporated herein by reference). Generally, content area coordinates within the template are provided specific identifiers that correspond to identifiers of the personalized content which allows the personal content to be populated to the template. The populated template is temporarily stored, rasterized, and eventually supplied to the printer for actual printing on media. The reader is referred to U.S. Pat. No. 7,310,640 for the specific details.

As mentioned above, some solutions to the overflow of the personalized content outside the boundaries of the content area of the template involve changing the size of the font, truncating the excessive personalized content, or altering the size of the content area within the template. However, the embodiments herein use knowledge-based rules to automatically apply logic to the decision of which portions of the personalized content is to be removed and which is to be retained. This allows the embodiments herein to produce a more useful variable information print product that retains only the most important or most relevant information. This increases the satisfaction of the ultimate recipient (the user) as well as the other parties involved (the vendor, third parties) because each party involved views the printed variable information document as being high quality and containing the most relevant information.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A method comprising:
    receiving, into a computerized device, a variable information print job, said variable information print job comprising a reference to content and used for said variable information print job and a reference to a template used for said variable information print job;
    determining if any of said content exceeds a size of a corresponding area of said template, using said computerized device;
    resolving size inconsistencies between said content and said corresponding area of said template by selectively removing portions of said content according to previously established rules to create a content subset, using said computerized device, said previously established rules including a priority list of data types that specifies an order in which said portions of said content can be removed; and
    printing said variable information print job using said content subset,
    said corresponding area of said template corresponding to said content and to said content subset, and
    said corresponding area being populated with said content subset when performing said printing of said variable information print job.

2. The method according to claim 1, said resolving of said inconsistencies comprising a retrieval of less than all of said content, if said content is componentized in a repository.

3. The method according to claim 1, said resolving of said inconsistencies comprising a filtering of said content to retrieve less than all of said content, if said content is maintained in a database.

4. The method according to claim 1, said resolving of said size inconsistencies being performed such that said content subset maintains only the most relevant portions of said content, as determined by relevancy standards within said predetermined rules.

5. The method according to claim 1, said variable information job being prepared and printed by a vendor target marketing a user.

6. A method comprising:
    receiving, into a computerized device, a variable information print job for a user, said variable information print job comprising a reference to content used for said variable information print job, and a reference to a template used for said variable information print job;
    determining if any of said content exceeds a size of a corresponding area of said template, using said computerized device;
    resolving size inconsistencies between said content and said corresponding area of said template by altering said content according to previously established user preferences to create altered content, using said computerized device, said previously established user preferences including a priority list of data types that specifies an order in which said portions of said content can be removed; and
    printing said variable information print job with said altered content,
    said corresponding area of said template corresponding to said content and to said altered content, and
    said corresponding area being populated with said altered content when performing said printing of said variable information print job.

7. The method according to claim 6, said resolving of said inconsistencies comprising a retrieval of less than all of said content, if said content is componentized in a repository.

8. The method according to claim 6, said resolving of said inconsistencies comprising a filtering of said content to retrieve less than all of said content, if said content is maintained in a database.

9. The method according to claim 6, said resolving of said size inconsistencies being performed such that said altered content maintains only the most relevant portions of said content, as determined by relevancy standards within said user preferences.

10. The method according to claim 6, said variable information job being prepared and printed by a vendor target marketing said user.

11. A method comprising:
    establishing rules;
    receiving, into a computerized device, a variable information print job, said variable information print job comprising a reference to content used for said variable information print job and a reference to a template used for said variable information print job;
    determining if any of said content exceeds a size of a corresponding area of said template, using said computerized device;
    resolving size inconsistencies between said content and said corresponding area of said template by selectively removing portions of said content according to said rules to dynamically reformulate said content into a content subset, using said computerized device said previously established rules includes a priority list of data types that specifies an order in which said portions of said content can be removed; and printing said variable information print job using said content subset, said corresponding area of said template corresponding to said content and to said content subset, and said corresponding area being populated with said content subset when performing said printing of said variable information print job.

12. The method according to claim 11, said resolving of said inconsistencies comprising a retrieval of less than all of said content, if said content is componentized in a repository.

13. The method according to claim 11, said resolving of said inconsistencies comprising a filtering of said content to retrieve less than all of said content, if said content is maintained in a database.

14. The method according to claim 11, said resolving of said size inconsistencies being performed such that said content subset maintains only the most relevant portions of said content, as determined by relevancy standards within said predetermined rules.

15. The method according to claim 11, said variable information job being prepared and printed by a vendor target marketing a user.

16. A non-volatile computer-readable medium encoded with computer-executable instructions performing a method comprising:

receiving a variable information print job, said variable information print job comprising a reference to content used for said variable information print job and a reference to a template used for said variable information print job;

determining if any of said content exceeds a size of a corresponding area of said template;

resolving size inconsistencies between said content and said corresponding area of said template by selectively removing portions of said content according to previously established rules to create a content subset, said previously established rules including a priority list of data types that specifies an order in which said portions of said content can be removed; and printing said variable information print job using said content subset, said corresponding area of said template corresponding to said content and to said content subset, and said corresponding area being populated with said content subset when performing said printing of said variable information print job.

17. The computer-readable medium according to claim 16, said resolving of said inconsistencies comprising a retrieval of less than all of said content, if said content is componentized in a repository.

18. The computer-readable medium according to claim 16, said resolving of said inconsistencies comprising a filtering of said content to retrieve less than all of said content, if said content is maintained in a database.

19. The computer-readable medium according to claim 16, said resolving of said size inconsistencies being performed such that said content subset maintains only the most relevant portions of said content, as determined by relevancy standards within said predetermined rules.

20. The computer-readable medium according to claim 16, said variable information job being prepared and printed by a vendor target marketing a user.

* * * * *